Nov. 10, 1964 M. L. BLEDSOE 3,156,307
QUICK DISCONNECT SWEEP
Filed Dec. 15, 1961

INVENTOR
MARTIN L. BLEDSOE

BY
ATTORNEY

United States Patent Office 3,156,307
Patented Nov. 10, 1964

3,156,307
QUICK DISCONNECT SWEEP
Martin L. Bledsoe, Rte. 2, St. Pauls, N.C.
Filed Dec. 15, 1961, Ser. No. 159,607
2 Claims. (Cl. 172—744)

This invention relates to agriculture and to implements and equipment utilized in the plowing and cultivation of the soil including those of wide applicability with regard to texture and moisture content of the soil.

The invention relates particularly to plow construction and use to the manner of attaching selective plow points or earth contacting elements to the standards to which they are applied and along which they are adjusted.

This is an improvement of my application Serial No. 88,207, filed February 9, 1961, now Patent No. 3,120,873.

Heretofore one or more bolts and nuts or other fasteners have been utilized for attaching plow points to the standards on which they were mounted with the bolts located in receiving openings and the heads of the bolts exposed and requiring the complete removal of the nuts from the bolts and the bolts in the process of attaching a plow point to its supporting standard or adjusting the same relative thereto.

It is an object of the invention to provide a connection for attaching a plow point solidly to a standard simply and inexpensively but allowing the same to be removed and replaced in a minimum of time and with a minimum of effort and which connection will protect the attaching means from abrasive contact with the earth and consequent wear.

A further object of the invention is to provide connecting means for attaching a plow standard to a plow point and having adjustable interfitting portions of relatively great strength held together by a single bolt and nut and which permits the parts to be easily assembled and disassembled and adjusted relatively to each other.

Another object of the invention is to provide connecting means for attaching a plow sweep to a plow standard wherein the standard may be of varying cross dimensions and in which the plow sweep is provided with fastening means which when loose will gravitate to a position adjacent to the standard to facilitate the connection of the plow sweep to standards of various sizes.

Figure 2:
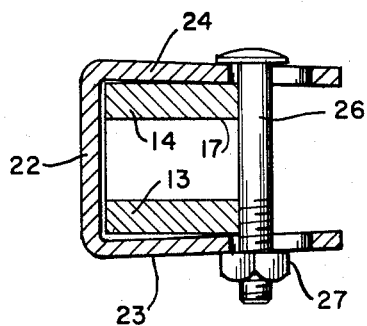
Figure 1:
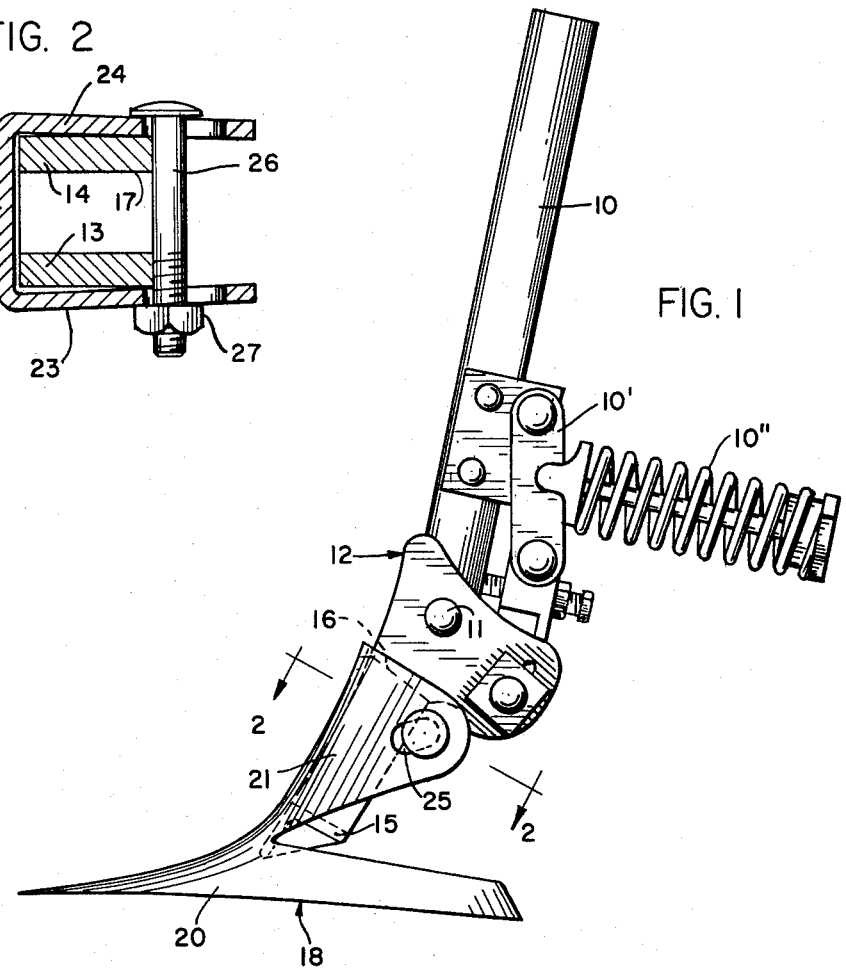

Other objects and advantages of the invention will be apparent from the following description taken in conjunction with the accompanying drawing wherein:

FIG. 1 is a side elevation with portions broken away and illustrating one application of the invention;

FIG. 2, an enlarged section on the line 2—2 of FIG. 1; and

Figure 3:
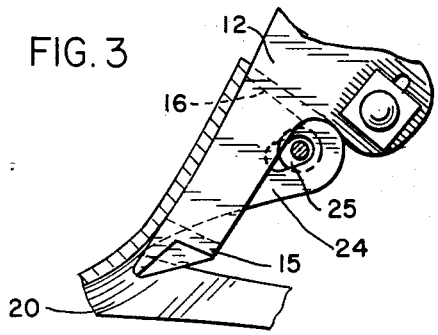

FIG. 3, an enlarged fragmentary section of the shank portion illustrating its mounting on the standard.

Briefly stated, the invention is directed to a novel plow blade having a shank portion adapted to receive a conventional plow standard and including a U-shaped shank portion which has a bolt mounted in a slot therein for holding the shank onto the standard but permitting easy adjustment therealong and is easily applied to and removable therefrom.

With continued reference to the drawing, a plow standard 10 is connected by a pivot bolt 11 to a plow point connector 12 near its lower end portion. The plow point connector has spaced side members 13 and 14 with a lower or end connection 15 and an intermediate connection 16, the spacing of the side members providing a slot therebetween.

In order that the plow point connector 12 may yield when the plow point strikes a boulder or obstruction of sufficient size, the plow point connector 12 is provided with a conventional spring loaded over-center toggle 10' including a spring 10''.

The side members 13, 14 and the connections 15, 16 are spaced to define a slot 17. In order to mount a plow point or sweep 18 on the side members 13, 14, the plow point has a blade portion 20 and a shank portion 21. The shank portion 21 has a fore part 22 and depending sides 23, 24, whose width increases from the connection with the blade portion 20 outwardly to the end of the shank, thus forming ears or wings on the fore part. The U-shaped shank portion described is of a size and shape to receive the side members 13, 14 therebetween and the sides 23, 24 have aligned apertures 25 through which a bolt 26 having a nut 27 extends. The apertures 25 are preferably elongated angularly and transversely to the shank in order to accommodate side members 13, 14 of varying widths and to aid in the secure retention of the sweep on the standard.

Prior to attaching the sweep to the plow standard the nut 27 is loose on the bolt, thereby permitting spreading apart of the wings 23, 24 and movement of the bolt 26 in the slot sufficiently that the standard may be inserted into the shank over the bolt. When the shank has been properly positioned the nut 27 is tightened with the bolt against the standard, thereby drawing the wings 23, 24 together and into tight engagement with the standard. Due to the binding of the shank on the standard the latter is securely held against inadvertent removal and bears along the fore part of the plow from the blade connection to the end of the shank.

To adjust or release the plow point or sweep from the standard the bolt 27 is loosened and, if necessary, the ears 23, 24 urged apart slightly, whereupon the plow point may be easily positioned or removed.

It will be apparent that when the plow point or sweep is in adjusted position the bolt and nut are so located as not to form an obstacle on which earth may build up as the implement is drawn through the ground.

Accordingly, it will be understood that a plow mounting connection is provided which is simple, of low cost and of increased strength which can be quickly and easily applied, adjusted and removed and which does not result in the build-up thereon of earth and that the structure permits removal and disassembly by the loosening of a single nut and without the necessity of disassembly of any other part.

It will be obvious to one skilled in the art that various changes may be made in the invention without departing from the spirit and scope thereof and therefore the invention is not limited by that which is illustrated in the drawing and described in the specifications, but only as indicated in the accompanying claims.

What is claimed is:

1. A quick disconnect plow sweep for mounting on a downwardly extending plow standard, said sweep comprising a generally horizontally disposed blade portion and a shank portion extending upwardly and rearwardly therefrom, said shank portion having a fore part and a pair of rearwardly extending generally parallel side members, each of said side members having a slot disposed on an angle relative to said fore part, adjustable fastening means extending through both of said slots, said slots being inclined from an upper rear position to a lower front position whereby when said fastening means is loosened it will gravitate toward the fore part of the shank.

2. A quick disconnect plow sweep for mounting on plow standards of varying thickness, said sweep comprising a blade portion and a shank portion, said shank portion being generally U-shaped and having side members of a length greater than the thickness of said standard, each of said side members having a slot disposed on an angle from an upper position exteriorly of said standard when assembled to a lower position adjacent to said standard, adjustable fastening means extending through both of said slots, whereby when said fastening means is loosened it will gravitate toward said standard.

References Cited in the file of this patent

UNITED STATES PATENTS

| | | |
|---|---|---|
| 779,060 | Auker | Jan. 3, 1905 |
| 1,037,355 | Stanza | Sept. 3, 1912 |
| 1,700,348 | Brooks | Jan. 29, 1929 |

FOREIGN PATENTS

| | | |
|---|---|---|
| 19,363/29 | Australia | Feb. 28, 1930 |